Jan. 4, 1955

C. H. JORGENSEN ET AL 2,698,654

JET ENGINE CONTROLLER

Filed May 27, 1949

INVENTORS
CLARENCE H. JORGENSEN
WILLARD T. NICKEL
HOWARD H. DIETRICH
THEODORE H. BOUGHTON

BY Spencer Hardman + Fehr

THEIR ATTORNEYS

Jan. 4, 1955

C. H. JORGENSEN ET AL 2,698,654

JET ENGINE CONTROLLER

Filed May 27, 1949

INVENTORS
CLARENCE H. JORGENSEN, WILLARD T. NICKEL,
HOWARD H. DIETRICH, THEODORE H. BOUGHTON
BY Spencer Hardman and Fehr
THEIR ATTORNEYS Jan. 4, 1955　　　C. H. JORGENSEN ET AL　　　2,698,654
JET ENGINE CONTROLLER Filed May 27, 1949　　　　　　　　　　8 Sheets-Sheet 6

INVENTORS
CLARENCE H. JORGENSEN, WILLARD T. NICKEL
HOWARD H. DIETRICH, THEODORE H. BOUGHTON
BY Spencer Hartman and Fehr
THEIR ATTORNEYS

INVENTORS
CLARENCE H. JORGENSEN
WILLARD T. NICKEL
HOWARD H. DIETRICH
THEODORE H. BOUGHTON
BY
THEIR ATTORNEYS

United States Patent Office 2,698,654
Patented Jan. 4, 1955

2,698,654
JET ENGINE CONTROLLER

Clarence H. Jorgensen, Willard T. Nickel, Howard H. Dietrich, and Theodore H. Boughton, Rochester, N. Y., assignors to General Motors Corporation, Detroit, Mich., a corporation of Delaware Application May 27, 1949, Serial No. 95,646

12 Claims. (Cl. 158—36.4)

This invention relates to apparatus for controlling the flow of fuel to the burners of a jet engine for aircraft having a continuous combustion turbine that drives a compressor which supplies compressed air to the burners. The speed of an airplane propelled by a jet engine of this type is dependent upon various factors including ambient air density, turbine speed and the flow of fuel to the burners. The flow of fuel can be manually regulated by the pilot and the manual fuel control may be set to give any selected airplane speed. However, the flow of fuel must be modified by variations in air density, in order to maintain any selected speed at different altitudes, because the turbine speed varies with variations in air density. Because the load on the compressor decreases as the air density decreases, the turbine speed can be maintained with less fuel upon decrease in air density and if the fuel supplied to the burners were not reduced upon increase in altitude, the speed would increase and vice versa.

Also variations in the ambient air temperature affect the fuel requirements. Less fuel is required to maintain operation of the turbine at a given speed at any altitude when the ambient air temperature is high than when it is low and in order to maintain a given turbine speed upon variation in temperature the fuel supply must be reduced if the temperature increases and increased if the temperature falls. The amount of variation in fuel supply required to maintain a selected turbine speed for any given change in temperature, depends on the speed of the turbine and is greater at high turbine speeds than at low speeds.

The primary object of the present invention, therefore, is to provide a device for regulating the flow of fuel to the burners of a jet engine having means controlled in response to variations in ambient air density, ambient air temperature and turbine speed for governing such fuel flow.

Figure 31:
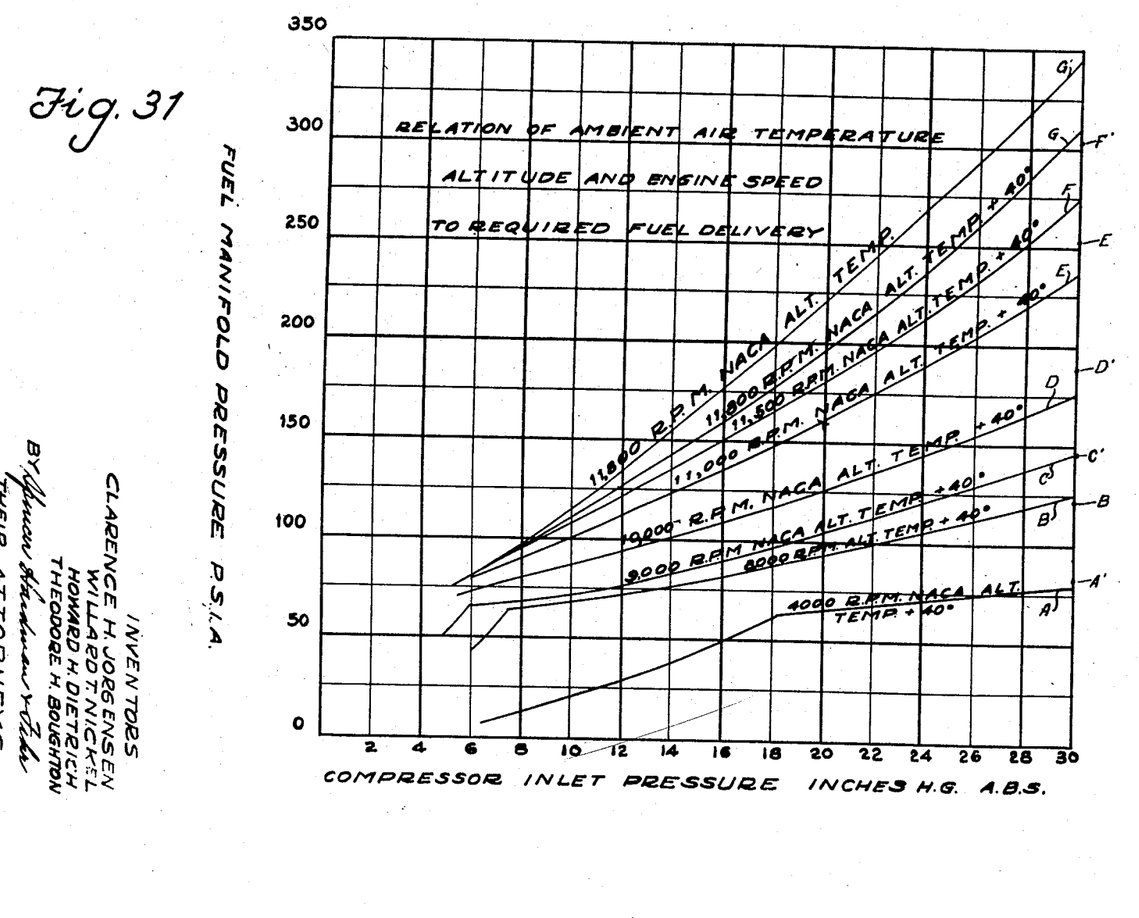
Fig. 31 is a chart showing the relation of ambient air temperature, altitude and engine speed to required fuel delivery.

The required correction of fuel delivery upon variation in temperature at different engine speeds and altitudes is graphically illustrated in Fig. 31. As altitude increases the speed lines B to G converge and come practically together at the high altitude corresponding to a compressor inlet pressure in the range of 6″ Hg abs. At that high altitude the fuel manifold pressure for any given calibration is low and there is little required compensation in fuel flow as the result of variation in ambient air temperature. Upon any decrease in altitude, as for example from 6″ Hg abs. for any given R. P. M. the fuel manifold pressure increases and the required fuel compensation made necessary by variation in ambient air temperature increases. Further, at any given altitude, the fuel manifold pressure increases, the speed increases and the required compensation for temperature variation increases, as shown by the curves of Fig. 31.

Similarly, the required fuel compensation is, additionally, substantially a function of the ambient air pressure.

A further feature of the invention is a specific form of fuel controlling valve assembly having fuel metering ports and passages so constructed and arranged that upon movement of the valve, the proper amount of fuel is supplied to the burners for operation at idling and at all different speeds and loads.

Further objects and advantages of the present invention will be apparent from the following description, reference being had to the accompanying drawings wherein a preferred embodiment of the present invention is clearly shown.

Figure 30:
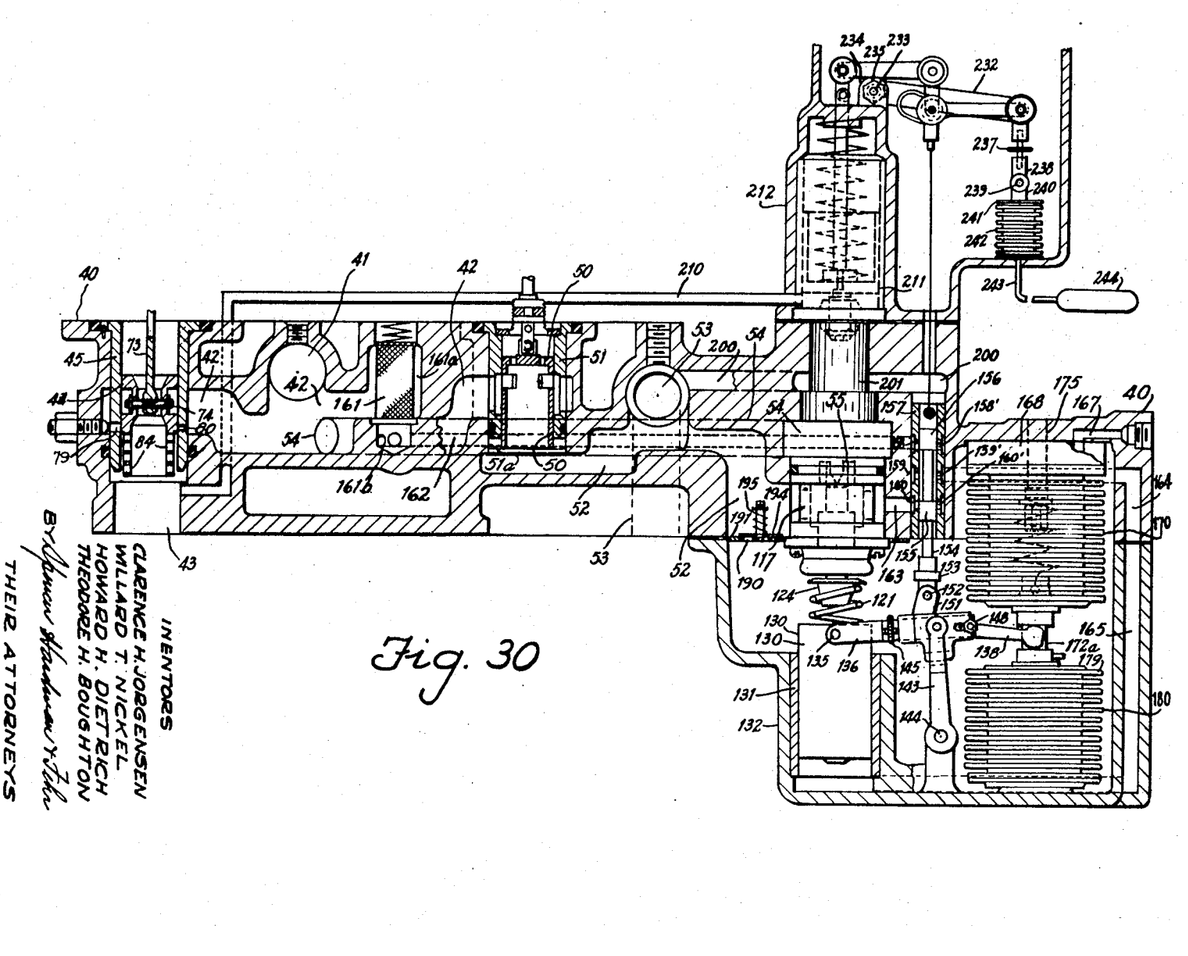
Fig. 30 is a diagram of the controller and comprises various sectional views thereof.

Referring to Fig. 30, a frame or housing 40 has an inlet 41 connected with a fuel pump driven by the internal combustion turbine of the jet engine. The inlet 41 is connected with a passage 42 from which fuel can flow to an outlet passage 43 when a valve 44, slidable in a guide sleeve 45 is open. Valve 44 is a throttle valve which is manually controlled in a manner to be described. Passage 42 is connectable by the by-passing valve 50 slidable in the sleeve 51, received in a recess 51a in the housing 40, with a by-pass passage 52 connected with an outlet passage 53 which a pipe, not shown, connects with the pump inlet. Passage 42 is connected to a duct 54 leading to a by-pass valve 55 which, on being opened, connects duct 54 with passage 52. Valve 55 is controlled automatically in a manner to be described. It is, therefore, apparent that fuel can flow from the pump through the inlet 41 through the throttle valve 44, when open, to the engine burners connected with outlet 43; and that fuel can be by-passed from the burners by valves 50 and 55.

When the valve 50 is open, the fuel which is by-passed from the passage 42 flows directly into passage 52 and back to the pump so that the automatically controlled valve is not effective. When valve 50 is closed, the by-passed fuel flows from passage 42 through passage 54 to the valve 55 which automatically controls the amount of fuel by-passed, in a manner described, and in this way controls the amount of fuel supplied to the burners.

Figure 4:
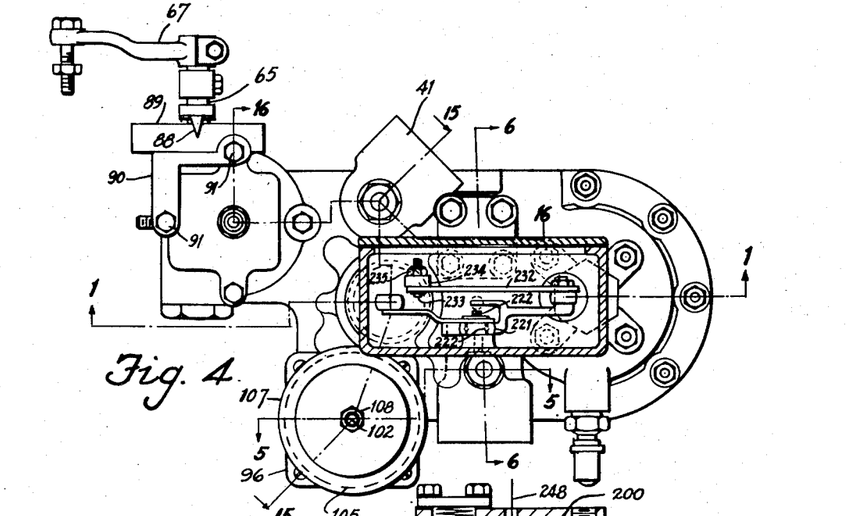
Fig. 4 is a plan view of the control, the part in section being on line 4—4 of Fig. 1.
Figures 7, 8, 9, 10:
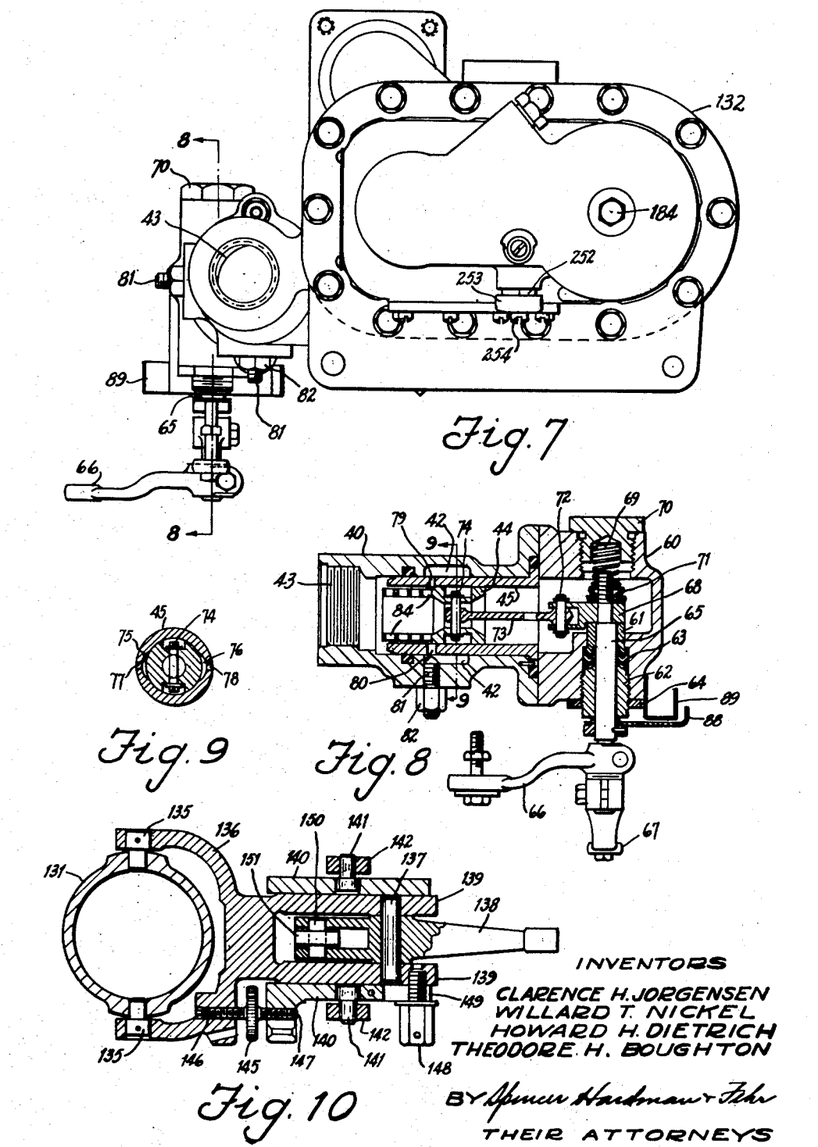
Fig. 7 is a bottom view of the controller in the direction of arrow 7 of Fig. 1.
Fig. 8 is a sectional view on line 8—8 of Fig. 7.
Fig. 9 is a sectional view on line 9—9 of Fig. 8.
Fig. 10, drawn to a larger scale than Fig. 1, is a sectional view on line 10—10 of Fig. 1.
Figures 11, 12, 14:
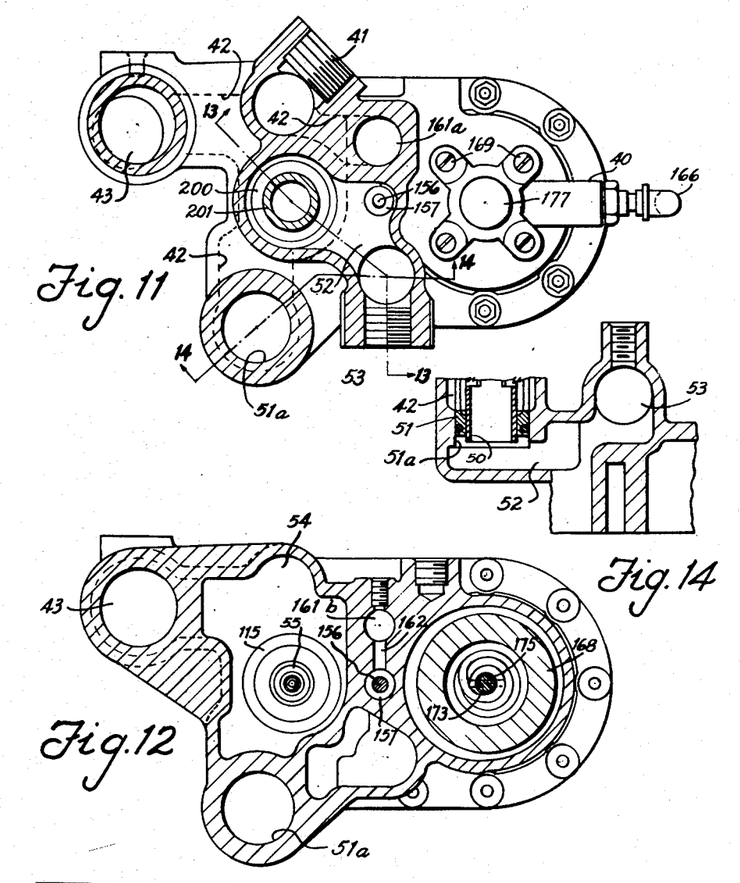
Fig. 11 is a sectional view on line 11—11 of Fig. 1.
Fig. 12 is a sectional view on line 12—12 of Fig. 1.
Fig. 14 is a sectional view on line 14—14 of Fig. 11.
Figure 13:
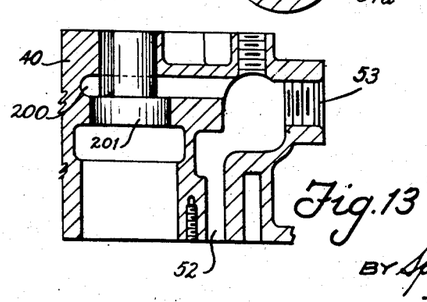
Fig. 13 is a sectional view on line 13—13 of Fig. 11.
Figure 23:
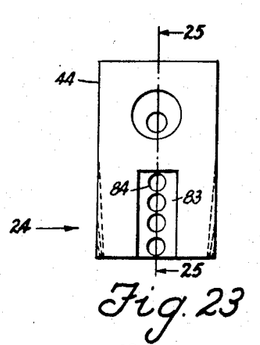
Fig. 23 is a side view of a throttle valve.
Figure 24:
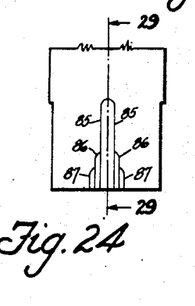
Fig. 24 is a fragmentary view in the direction of arrow 24 of Fig. 23.
Figure 25:
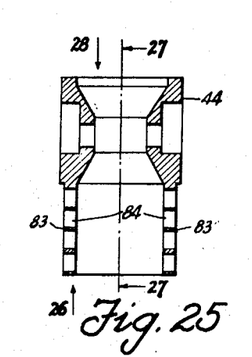
Fig. 25 is a sectional view on line 25—25 of Fig. 23.
Figure 26:
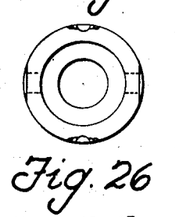
Fig. 26 is a view in the direction of arrow 26 of Fig. 25.
Figure 27:
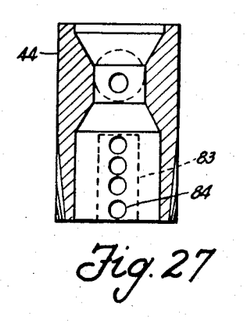
Fig. 27 is a sectional view on line 27—27 of Fig. 25.
Figure 28:
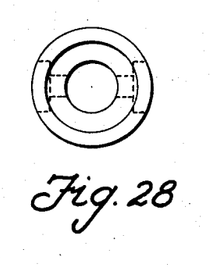
Fig. 28 is a view in the direction of arrow 28 of Fig. 25.
Figure 29:
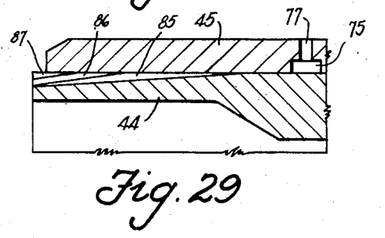
Fig. 29, drawn to a larger scale than Fig. 24, shows a section on line 29—29 of Fig. 24, together with a portion of a valve guide 45.

The control of valve 44 will now be described with reference to Fig. 8. To the housing 40 there is attached a frame 60 which supports a fixed bushing 61 and an adjustable bushing 62 with packing members 63 between them. Bushing 62 is secured in adjusted position by a nut 64. Bushings 61 and 62 support a shaft 65 carrying levers 66 and 67 either of which may be used to turn the shaft. Shaft 65 is connected with a crank arm 68 which is urged laterally against the bushing 61 by a spring 69 retained by a plug 70 and pushing against a nut 71 threaded on the shaft 65, thus providing a shaft seal. Crank 68 is connected by a pin 72 with a link 73 connected by a pin 74 with the valve 44. As shown in Fig. 9, the sleeve 45 has diametrically opposite grooves 75 and 76 which communicate with the passage 42 by holes 77 and 78, respectively. In a plane at right angles to the plane of holes 77 and 78, the sleeve 45 provides holes 79 and 80 (Fig. 8). Flow through hole 80 is controlled by the needle valve provided by a screw 81 threaded through the housing 40 and retained in adjusted position by a nut 82. In alignment with the holes 79 and 80, the valve 44 (Figs. 23 and 25) provides parallel flat surfaces 83 through which a series of holes 84 are drilled, the spacing of these holes increases from top to bottom in Fig. 25. In the plane of holes 77 and 78, as shown particularly in Fig. 29, the valve 44 provides a relatively long groove 85 which communicates with shorter grooves 86 and 87 (Fig. 24). The grooves 85, 86 and 87 control flow from passage 42 through holes 77, 78 and grooves 75, 76 (Fig. 9) into outlet 43. The valve 44 controls fuel flow accurately throughout the range from idle to maximum turbine speed. The holes 79 and 80 provide a graduated control of fuel for idling and the needle valve 81 provides an adjustment of fuel flow for idling. The flow rates represented by angular positions of the shaft 65 are indicated by pointer 88 secured to the shaft cooperating with a scale 89 provided by a bracket 90 (Fig. 4) which screws 91 secure to the frame 60.

Figure 5:
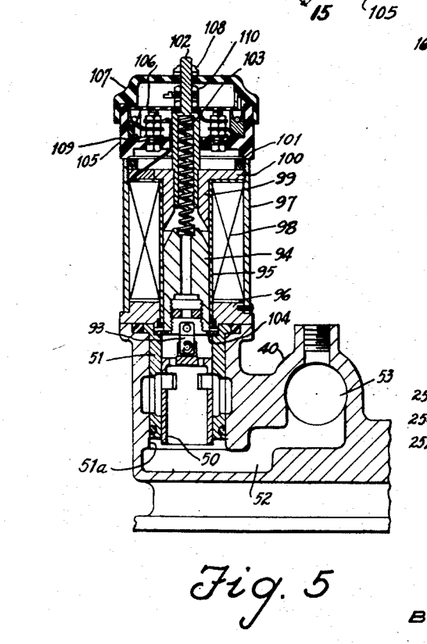
Fig. 5 is a sectional view on line 5—5 of Fig. 4.

The control of the by-pass valve 50 will now be described with reference to Fig. 5. Valve 50 is connected by a link 93 with a solenoid armature 94 slidable in a non-magnetizable tube 95 fixed to a magnetizable base 96 attached to housing 40 and to a magnetizable shell 97 which surrounds a magnet coil 98 which surrounds the tube 95 which surrounds a core 99 provided by a plate 100 threaded in the shell 97 and secured by a nut 101. A bushing 102 attached to the core 99 receives a spring 103 which urges the armature 95 downwardly against a stop washer 104. Bushing 102 extends centrally through a non-conducting cup 105, a non-conducting plate 106 and a non-conducting cover 107, all of which are retained by nut 108 threaded on the upper end of the bushing 102. Cap 105 supports binding posts 109 to which the ends of the coil 98 are attached, and plate 106 and cover 107 enclose terminals connected with the binding posts, one of these terminals being marked 110. The solenoid coil 98 is normally de-energized so that valve 50 will be normally open. In an emergency, coil 98 is energized so that valve 50 will be closed to enable valve 55 to control the by-passing action of the regulator.

Figures 1, 2, 3:
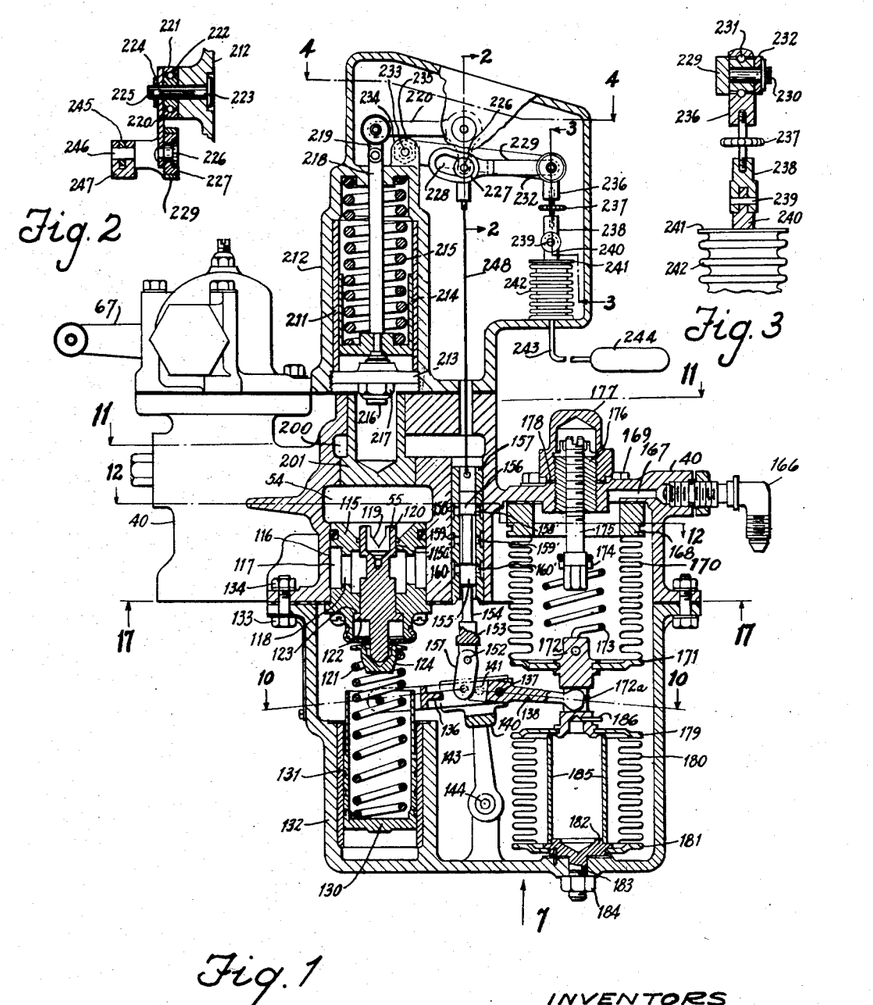
Fig. 1 is a sectional view on line 1—1 of Fig. 4.
Fig. 2 is a sectional view on line 2—2 of Fig. 1, and is drawn to a larger scale.
Fig. 3, which is on the same scale as Fig. 1, is a sectional view on line 3—3 of Fig. 1.

The control of by-pass valve 55 will now be described with reference to Fig. 1. Valve 55 slides in a guide 115 received by a bore 116 of housing 40 and having a groove 117 connected as shown in Fig. 30 with by-pass 52 and connected with the interior thereof by holes 118. Valve 55 is provided with flow-metering notches 119 and its flange 120 which is guided by the annular flange 115a of guide 115. When the notches 119 are below the flange 115a the by-passing of fuel from passage 54 to passage 52 can take place. As shown in Fig. 1, valve 55 is in closed position, being urged upwardly by spring 121 until a flange 122 of the valve engages a shoulder 123 of the guide 115. Spring 121 directly engages a cup 124 having a recess for directly engaging the spherical lower end of valve 55. The spring 121 is confined under compression between cup 124 and the bottom or head of a piston 130 received by a sleeve 131 press-fitted into a housing 132 which screws 133 and nuts 134 attach to the housing 40.

Referring now to Fig. 10, the piston 131 has diametrically opposite holes for receiving pins 135 attached to the arms of a lever 136 carrying a pin 137 supporting a lever 138. Lever 138 has a bifurcated portion 139 which is slidable in a cradle 140 carrying fulcrum pins 141 received by the arms 142 of a lever 143 (Fig. 30) pivoted on a pin 144 supported by a housing 132. A thumb screw 145 having its shanks 146 and 147 provided respectively with right hand and left hand threads threadedly engage lever 136 and the cradle 140. By turning the thumb screw the distance between the axes of the pins 135 and 141 can be varied. When the proper adjustment of this relation has been secured the lever 136 is fixed to the cradle 140 by tightening the screw 148 which extends through a notch 149 in the cradle and is threaded into the lever 136.

The left end of lever 138 is connected by a pin 150 with a link 151 (Fig. 1) connected by a pin 152 with a clevis 153 on the end of a valve 154 having lands 155 and 156 and slidable in a valve guide 157 having grooves 158, 159 and 160 which are connected by holes 158', 159' and 160' with the interior of the valve guide. As shown in Fig. 30 passage 42 is connected through a filter 161 with a passage 162 connected with groove 158. A passage 163 connects groove 160 (Fig. 30) with by-pass 52 through the groove 117 of the valve guide 115. Groove 159 connects with a passage 164 in housing 40 connected with a passage 165 in housing 132 which leads to the lower end of cylinder 131.

The valve 154 is under control by means which senses altitude pressure and is directly responsive to pressure at the inlet of the air compressor, said inlet being connected by pipe and a coupling 166 and a passage 167 leading to the interior of a ring 168 which screws 169 attach to housing 40. Ring 168 is attached to a metal bellows 170 having its lower end attached to a disc 171 supporting a bar 172 to which the lower end of a tension spring 173 is attached. The upper end of this spring is supported by a pin 174 attached to a screw 175 threaded through a bushing 176, threaded through the housing 40 and enclosed by a cap 177, threaded on the bushing 176 and serving to prevent rotation of bushing 176 when screwed down against a sealing gasket 178. The bar 172 is provided with a recess 172a for receiving lever 138 and is attached to a plate 179 attached to a bellows 180, the lower end of which is attached to a plate 181 having an aperture for receiving a disc 182 integral with a screw 183 passing through the housing 132 and receiving a nut 184. The disc 182 supports a tube 185 which limits contraction of bellows 180 which is evacuated through a pipe 186 which, after evacuation, is sealed.

The pressure of liquid fuel in the passage 54 tends to open valve 55 against the action of spring 121. Therefore, the compression of spring 121 must be adjusted to balance pressure on the valve 55 so it will be in the required by-passing position. As altitude increases bellows 180 expands, thereby causing lever 138 to rotate counterclockwise on its pivot pin 137 which causes valve 154 to move down to connect grooves 159 and 160 thereby permitting liquid below the piston 130 to escape under the action of spring 121 which moves the piston down, this liquid escaping through passage 165, 164 and 163 to the by-pass 152. This relieves pressure on the spring 121 so that pressure above the valve 55 tends to open it more to increase the by-passing action. As the piston 131 moves down it causes counterclockwise rotation of lever 136 about the pivot pins 141 supported by a lever 143 thereby causing pivot pin 137 supporting lever 138 to move up to cause valve 154 to move up to block escape of liquid through holes 160'. Therefore the controller comes to equilibrium with the spring 121 under the desired compression required for holding the valve 55 in the proper by-passing position. Therefore the by-passing action of valve 55 has been increased so that less fuel will be delivered to the burners when the altitude increases.

When altitude decreases more fuel is required by the burners. Therefore less by-passing by the valve 55 is required. Therefore the compression of spring 121 should be increased. As altitude decreases bellows 180 contracts toward the position shown in Fig. 1 thereby causing lever 138 to move clockwise on its pivot pin 137 and the valve 154 to move up to connect grooves 158 and 159 thereby causing the passage 54 to be connected with the lower end of cylinder 131 through the following: passage 54, groove 158, holes 158', holes 159', groove 159, passages 164 and 165. This causes the piston 130 to move up to increase the compression of spring 121 thereby decreasing the by-passing action of the valve 55. As piston 130 moves up lever 136 is moved clockwise about the pivot pin 141 of lever 143 thereby causing the pivot 137 of lever 138 to move down and the valve 154 to move down to block the holes 158'. Therefore the controller will come to equilibrium when the compression of spring 121 is such as to cause the valve 55 to have that lesser amount of by-passing action required for increasing the fuel as altitude decreases.

Figures 15, 16, 17, 18, 19, 20, 21, 22:
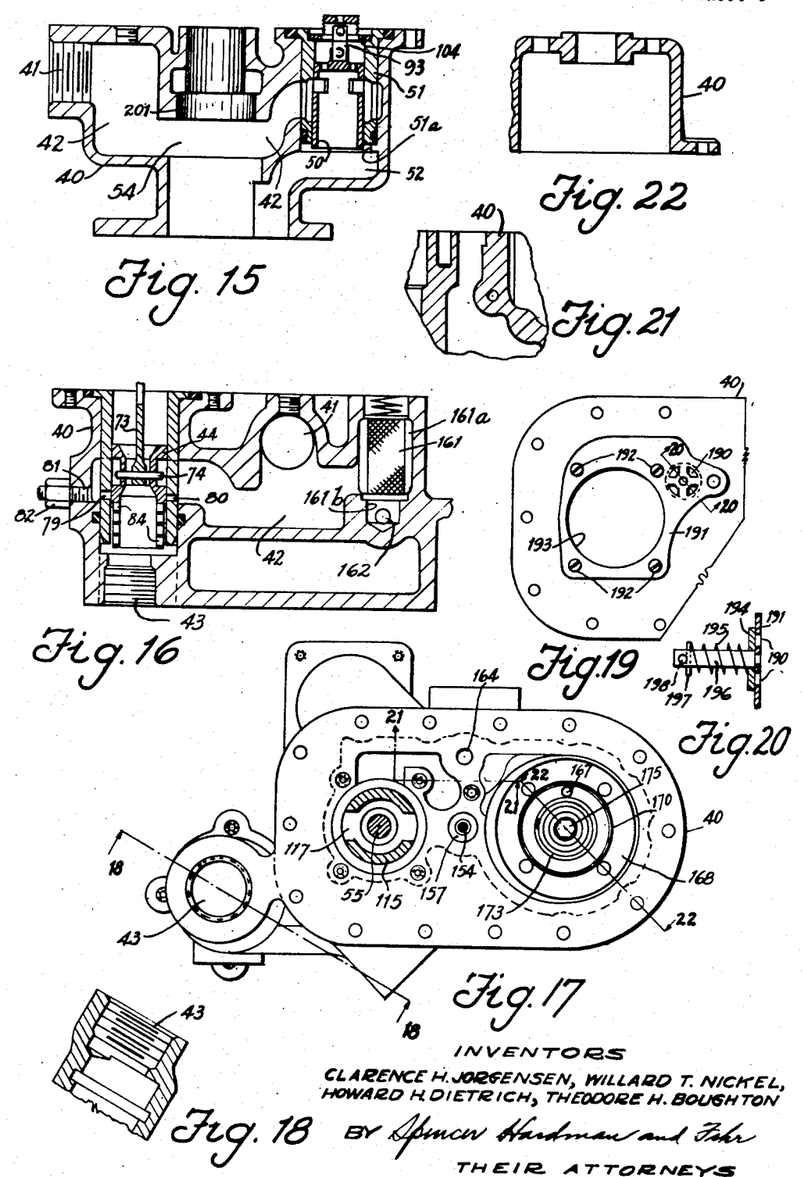
Fig. 15 is a sectional view on line 15—15 of Fig. 4.
Fig. 16 is a sectional view on line 16—16 of Fig. 4.
Fig. 17 is a bottom view of housing 40 on line 17—17 of Fig. 1.
Fig. 18 is a sectional view on line 18—18 of Fig. 17.
Fig. 19 is a view of a portion of housing 40 as shown in Fig. 17, with a baffle member 191 added.
Fig. 20 is a sectional view on line 20—20 of Fig. 19 and is drawn to a larger scale.
Fig. 21 is a sectional view on line 21—21 of Fig. 17.
Fig. 22 is a fragmentary sectional view on line 22—22 of Fig. 17.

Since the piston 130 and the valve 154 are required to have an easy sliding action in their respective cylinder and valve guide there is some leakage of fuel oil into the chamber provided by the housing 132. As its level rises, this oil can escape finally to the by-pass 52 through holes 190 in a baffle plate 191 which is shown in Fig. 19 as attached by screws 192 to the underside of housing 40. The central hole 193 in plate 191 receives the flange portion of valve guide 115. A sudden closing of the throttle valve would cause considerable increase in pressure in the by-pass 52. This pressure is not communicated to the fuel oil in the housing 132 by virtue of a check valve 194 which is normally closed by a spring 195 (Fig. 20) which surrounds a rod 196 attached to the baffle 191, said spring being retained by a washer 197 retained by a cotter pin 198. When the throttle valve is suddenly closed the pressure in the by-pass is high since pump speed does not quickly decrease. Therefore, if the check valve 194 were not present, the bellows would be subjected to a sudden increase in back pressure which would interfere with its function of by-pass control. Fuel oil can escape past and above the valve 154 into a chamber 200 separated from passage 54 by a plug 201 and connected with by-pass outlet 53.

Referring to Fig. 31, curves A, B, C, D, E, F, and G represent fuel requirements for various compressor inlet pressures for various turbine speeds when the outside air temperature is 40° higher than a standard temperature 60° F. Curve G' shows fuel requirements at various altitudes for 11,800 R. P. M. turbine speed for standard air temperatures. By comparing curves G and G' it will be seen that starting at sea level the fuel requirements are much higher for 60° ambient air temperature than for 100°. The curves for 60° ambient air temperature corresponding to curves B, C, D, E and F, are not shown except their starting points at sea level, F' being the starting point of a curve for 11,500 R. P. M. at standard temperature; E' being the starting point of a curve for 11,000 R. P. M. at standard temperature; and D' for 10,000 R. P. M. at standard temperature; C' for 9,000 R. P. M., B' for 8,000 R. P. M. and A' for 4,000 R. P. M. It is therefore apparent from this data that correction or modification of the by-passing action is not required at turbine speeds of 9,000 or less.

The means responsive to ambient air temperature for modifying the temperature of the regulator will now be described with reference to Figs. 1, 2, 3 and 30. As shown diagrammatically in Fig. 30, the fuel outlet passage 43, connected with the burners, is connected by duct 210 with the lower end of a cylinder 211 which, as shown in Fig. 1, is an insert in a housing 212 attached to housing 40. The lower end of the cylinder is closed by a plug 213 and receives a piston 214 which a spring 215 forces downwardly against a screw 216 threaded through the plug 213 and secured in adjusted position by nut 217. The spring 215 is so calibrated that the piston 214 will not start to move up until pressure in the fuel manifold has attained some relatively high value corresponding, for example to about 9,000 R. P. M. turbine speed. Piston 214 is connected by a rod 218 and a link 219 with a lever 220 whose hub 221 (Fig. 4) is journaled on a ball bearing 222 the inner race of which is supported by a pin 223 (Fig. 2) passing through the housing 212 and receiving a washer 224 retained by a pin 225. Lever 220 carries a stud 226 on which there is journaled a roller 227 received by an arcuate slot 228 in a lever 229 attached to a pivot pin 230 which passes through the inner race of a ball bearing 231 and also through a lever 232 pivoted on a screw 233 threaded on an ear 234 of the housing 212 and retained by a nut 235. The outer race member 236 of ball bearing 231 is connected by thumb screw 237 having oppositely threaded shanks with a clevis 238 connected by pin 239 with a stud 240 attached to the upper plate 241 of a metal bellows 242 attached to the housing 212. The bellows 242 is connected by a pipe 243 with a bulb 244 located in thermal relation to the outside air. Bellows, pipe and bulb are filled with a liquid having a relatively high temperature coefficient of expansion. Lever 229 has an arm 245 (Fig. 2) carrying a pin 246, the axis of which is aligned with the axis of roller 227 until the piston 214 starts to move up. Pin 246 is connected by a clevis 247 with a rod 248 connected with the sleeve 157. While turbine speed is insufficient to cause the pump driven thereby to deliver fuel into passage 43 with pressure sufficient to lift the piston 214 against the action of spring 215, ambient air temperature has no effect because the lever 229 rocks about the axis of roller 227 (then in alignment with pin 246) when there is a temperature change. Therefore the sleeve valve 157 remains relatively fixed. However, when turbine speed begins to exceed 9,000 R. P. M., for example, piston 214 begins to move up and roller 227 begins to move out of alignment with pin 246. Therefore, when ambient air temperature increases, the valve 157 will be raised and the by-passing action of valve 55 will be increased to permit less fuel to flow to the burners. Conversely, when the temperature decreases, valve 157 will be lowered to effect increase of compression of the spring 121 so that the by-pass action of valve 55 will be decreased and more fuel will be permitted to pass to the burners.

Figure 6:
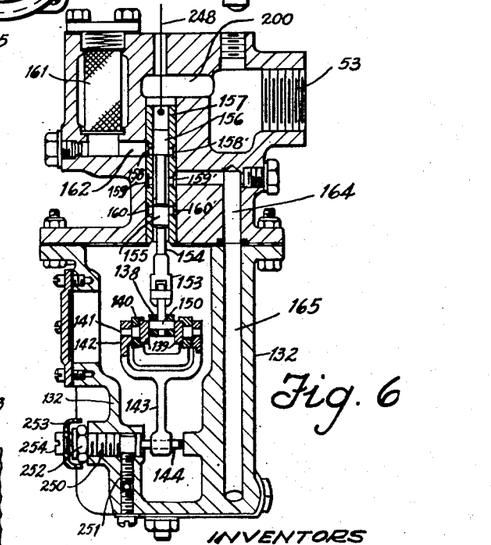
Fig. 6 is a sectional view on line 6—6 of Fig. 4.

Referring to Fig. 6, the spool valve member 154 can be initially adjusted for a factory setting by turning a screw 250 threaded in housing 132 in order to raise or lower the fulcrum pin 144 of lever 143, said pin being supported by the screw 250 eccentrically thereof. The screw 250 is locked in adjusted position by a set screw 251 and by a lock nut 252 which, after the adjustment is made, is enclosed by a cover cap 253 attached to screw 250 by a screw 254 which is seal-wired to the housing 132.

As specifically illustrated herein, the device which forms the subject of this invention is intended to be used as an auxiliary control. The supply of fuel to the burners of the engine is normally controlled by another device, that may be designated the main fuel control, which is not shown but which has a manually positioned throttle and automatic means responsive to variations in speed and air density for variably controlling the flow of fuel. The throttle of such device is adapted to be connected to the throttle of the device shown herein so that the two throttles are set in corresponding position. The device disclosed herein normally does not function because the valve 50 operated by the solenoid is normally in open position. The solenoid which controls valve 50 is, itself, controlled by a switch which is responsive to a pressure created when the main fuel control device is functioning properly. If such main fuel control device fails to function properly, the pressure operated switch is actuated, the valve 50 is closed by the solenoid, causing the device shown herein to become operative to properly control the fuel without any attention whatever by the pilot, and the setting of throttle 44 of this device requires no attention by the pilot because it is set simultaneously with the throttle of the main fuel control.

It was not deemed necessary to illustrate the main fuel control device, or the operating connections for the throttle, or the solenoid control switch, because the device shown herein can be used as the sole means for controlling the supply of fuel and the claims are all directed to the construction of the device disclosed herein per se and are applicable to such device whether it is used as the sole means for controlling the fuel supply, or whether it is used as an emergency control only, in combination with another main fuel control which is normally effective.

If the device disclosed and claimed herein is employed as the sole means for controlling the fuel supply, the automatically controlled solenoid valve 50 could be omitted entirely and the passage controlled omitted or permanently blocked by suitable means so that fuel in space 42 will flow through passage 54 to the automatically operated control valve 55. Also if desired, the by-passing valve 50 could be retained and some manually operable means could be provided by which the valve 50 could be maintained in its closed position.

While the embodiment of the present invention as herein disclosed, constitutes a preferred form, it is to be understood that other forms might be adopted.

What is claimed is as follows:

1. In a jet engine which includes an internal combustion turbine, an air compressor driven by said turbine, fuel burners, a pump for supplying fuel to the burners, a valve connected with the pump outlet for by-passing fuel to a supply tank, and a mechanism for automatically controlling the operation of said valve, in which said mechanism includes means responsive to variations in altitude pressure for controlling the valve and effective to cause movement of said valve to a position to decrease the area of the by-pass passage and increase the fuel flow to the burner upon an increase in altitude pressure, additional means independently operable and responsive to variations in ambient temperature for controlling said by-pass valve, said additional means being adapted upon an increase in temperature to cause movement of said valve to a position to increase the area of the by-pass passage and decrease the fuel flow to the burner, and means controlled by turbine speed for controlling the operation of said temperature responsive means and operable when a predetermined turbine speed is reached to render said temperature responsive means effective and operable under the predetermined speed to render said temperature responsive means inoperative.

2. In an engine which includes an internal combustion turbine, an air compressor driven by said turbine, fuel burners, a pump for supplying fuel to the burners, a valve connected with the pump outlet for by-passing fuel to a supply tank, and a mechanism for automatically controlling the operation of said valve, in which said mechanism includes means responsive to variations in altitude pressure for controlling the valve and effective to cause movement of said valve to a position to decrease the area of the by-pass passage and increase the fuel flow to the burner upon an increase in altitude pressure, additional means independently operable and responsive to variations in ambient temperature for controlling said by-pass valve, said additional means being adapted upon an increase in temperature to cause movement of said valve to a position to increase the area of the by-pass passage and decrease the fuel flow to the burner, and means controlled by pump output pressure for controlling the operation of said temperature responsive means and operable when a predetermined pressure is reached to render said temperature responsive means effective and operable under the predetermined pressure to render said temperature responsive means inoperative.

3. Apparatus for controlling flow of fuel to the burners of a jet engine having an internal combustion turbine which drives an air compressor connected with the burners and a pump for supplying fuel to the burners comprising a valve adapted to be connected with the pump outlet for by-passing fuel to a supply tank, said valve being urged to open by fuel pressure, a compression spring opposing opening movement of the valve, a cylinder, a piston in said cylinder for determining the compression of the spring according to fluid pressure acting on the piston, a pilot valve for admitting fuel liquid under pressure to the cylinder or permitting liquid to escape therefrom to the supply tank, said pilot valve comprising a spool member and a sleeve member, means under control by altitude pressure for displacing one member relative to the other from equilibrium position and under control by piston movement for restoring said member to equilibrium position, and means under control by ambient air temperature for controlling the other member of the pilot valve.

4. Apparatus for controlling flow of fuel to the burners of a jet engine having an internal combustion turbine which drives an air compressor connected with the burners and a pump for supplying fuel to the burners comprising a valve adapted to be connected with the pump outlet for by-passing fuel to a supply tank, said valve being urged to open by fuel pressure, a compression spring opposing opening movement of the valve, a cylinder, a piston in said cylinder for determining the compression of the spring according to fluid pressure acting on the piston, a pilot valve for admitting fuel liquid under pressure to the cylinder or permitting liquid to escape therefrom to the supply tank, said pilot valve comprising a spool member and a sleeve member, means under control by altitude pressure for displacing one member relative to the other from equilibrium position and under control by piston movement for restoring said member to equilibrium position, and means adapted to be controlled by turbine speed and ambient air temperature for controlling the other member of the pilot valve.

5. Apparatus for controlling flow of fuel to the burners of a jet engine having an internal combustion turbine which drives an air compressor connected with the burners and a pump for supplying fuel to the burners comprising a valve adapted to be connected with the pump outlet for by-passing fuel to a supply tank, said valve being urged to open by fuel pressure, a compression spring opposing opening movement of the valve, a cylinder, a piston in said cylinder for determining the compression of the spring according to fluid pressure acting on the piston, a pilot valve for admitting fuel liquid under pressure to the cylinder or permitting liquid to escape therefrom to the supply tank, said pilot valve comprising a spool member and a sleeve member, means under control by altitude pressure for displacing one member relative to the other from equilibrium position and under control by piston movement for restoring said member to equilibrium position, means under control by ambient air temperature for moving the other member of the pilot valve, and means adapted to depend upon the speed of the turbine for determining the amount of movement of said other member which is effected in response to change in ambient air temperature.

6. Apparatus for controlling flow of fuel to the burner of a jet engine having an internal combustion turbine which drives an air compressor connected with the burners and a pump for supplying fuel to the burners comprising a valve adapted to be connected with the pump outlet for by-passing fuel to a supply tank, said valve being urged to open by fuel pressure a compression spring opposing opening movement of the valve, a cylinder, a piston in said cylinder for determining the compression of the spring according to fluid pressure acting on the piston, a pilot valve for admitting fuel liquid under pressure to the cylinder or permitting liquid to escape therefrom to the supply tank, said pilot valve comprising a spool member and a sleeve member, means under control by altitude pressure for displacing one member relative to the other from equilibrium position and under control by piston movement for restoring said member to equilibrium position, a lever, a movable fulcrum for the lever, a link connected with the other member of the pilot valve and with the lever at a portion thereof with which the fulcrum is normally in alignment means controlled by ambient air temperature for moving the lever about its fulcrum and means effective upon attainment of a certain turbine speed to begin to move the fulcrum transversely of said link from its normal position, the distance moved depending on turbine speed, whereby the amount of movement of the temperature controlled pilot valve member for a given change in ambient air temperature is adapted to increase as turbine speed increases.

7. Apparatus for controlling flow of fuel to the burners of a jet engine having an internal combustion turbine which drives an air compressor connected with the burners and a pump for supplying fuel to the burners comprising a valve adapted to be connected with the pump outlet for by-passing fuel to a supply tank, said valve being urged to open by fuel pressure, a compression spring opposing opening movement of the valve, a cylinder, a piston in said cylinder for determining the compression of the spring according to fluid pressure acting on the piston, a pilot valve for admitting fuel liquid under pressure to the cylinder or permitting liquid to escape therefrom to the supply tank, said pilot valve comprising a spool member and a sleeve member, means under control by altitude pressure for displacing one member relative to the other from equilibrium position and under control by piston movement for restoring said member to equilibrium position, a lever, a movable fulcrum for the lever, a link connected with the other member of the pilot valve and with the lever at a portion thereof with which the fulcrum is normally in alignment, means controlled by ambient air temperature for moving the lever about its fulcrum, means for moving the fulcrum transversely of the link including a servo comprising a cylinder and a movable piston, a spring urging the piston toward one end of the cylinder and normally maintaining the piston in a position such that the fulcrum is in normal position and a duct connecting said cylinder end with the pump outlet whereby in response to a fluid pressure corresponding to a certain turbine speed the piston begins to move from normal position to cause the fulcrum to move from normal position, the distance moved being adapted to depend on turbine speed, whereby the amount of movement of the temperature controlled pilot valve member for a given change in ambient air temperature increases as turbine speed increases.

8. Apparatus for controlling flow of fuel to the burners of a jet engine having an internal combustion turbine which drives an air compressor connected with the burners and a pump for supplying fuel to the burners comprising a valve adapted to be connected with the pump outlet for by-passing fuel to a supply tank, said valve being urged to open by fuel pressure, a compression spring opposing opening movement of the valve, a cylinder, a piston in said cylinder for determining the compression of the spring according to fluid pressure acting on the piston, a pilot valve for admitting fuel liquid under pressure to the cylinder or permitting liquid to escape therefrom to the supply tank, means under control by altitude pressure for adjusting the valve to effect admission of fuel liquid under pressure to the cylinder when altitude pressure increases thereby causing piston movement to increase spring compression in order to decrease by-passing action and vice versa to effect release of fuel liquid from the cylinder when altitude pressure decreases, means responsive to piston movement for returning the valve to equilibrium position, a chamber receiving fuel liquid leaking past the piston and the pilot valve, a duct forming a connection between the chamber with the fuel tank and a check valve preventing flow from the duct into the chamber.

9. In an apparatus for controlling the flow of fuel to the burners of a jet engine and provided with an idling fuel inlet port for supplying fuel for operation of the engine while idling and a main fuel inlet port for supplying fuel for operation of the engine under load, a throttle valve movable relatively to said ports and controlling the flow therethrough, said throttle valve having a passage formed therein adapted to cooperate with the idling fuel port and so designed that the flow of fuel for idling is progressively increased as the throttle is moved in one direction, said throttle being also provided with a plurality of tapered grooves in the surface thereof to permit a flow of fuel for engine operation under load when said grooves are in registry with said main fuel inlet, said grooves being so spaced with respect to the idling passage that the idling fuel supply is fully open before the grooves are brought into registry with the idling fuel in it as the throttle is moved to increase the fuel supply.

10. In an apparatus for controlling the flow of fuel to the burners of a jet engine and provided with an idling fuel inlet port for supplying fuel for operation of the engine while idling and a main fuel inlet port for supplying fuel for operation of the engine under load, a throttle valve movable relatively to said ports and controlling the flow therethrough, said throttle valve having a passage formed therein adapted to cooperate with the idling fuel port and so designed that the flow of fuel for idling is progressively increased as the throttle is moved in one direction and the flow of fuel through the idling passage continues throughout the entire movement of the throttle in such direction, said throttle being also provided with a plurality of tapered grooves in the surface thereof to permit a flow of fuel for engine operation under load when said grooves are in registry with said main fuel inlet, said grooves being so formed that the flow of fuel through each groove is progressively increased as the throttle is moved in one direction and so spaced with respect to the idling passage that the idling fuel supply is fully open before the grooves are brought into registry with the idling fuel inlet as the throttle is moved to increase the fuel supply and said grooves being located on the movable valve member so that they are successively brought into registry with the main fuel supply port.

11. In an apparatus for controlling the flow of fuel to the burners of a jet engine, a throttle valve assembly comprising a fixed sleeve having spaced ports therein, one of which ports forms an inlet for idling fuel and another of which forms a main fuel inlet for supplying fuel for operating the engine under load, and a tubular valve member slidable in said sleeve, said valve member having a passage formed therein movable into registry with the idling fuel inlet as the tubular member slides in one direction and so shaped that the flow of fuel through the idling fuel inlet is progressively increased as the tubular member is moved in one direction, a plurality of tapered grooves in the surface of said tubular member which terminate at different positions along the axis of said member so that such grooves are successively brought into registry with the main fuel inlet port and the flow of fuel through each groove is also progressively increased as the tubular member slides within its cooperating sleeve and means for sliding the member within the sleeve to variably control the fuel supply.

12. In an apparatus for controlling the flow of fuel to the burners of a jet engine, a throttle valve assembly comprising a fixed sleeve having spaced ports therein, one of which ports forms an inlet for idling fuel and another of which forms a main fuel inlet for supplying fuel for operating the engine under load, and a tubular valve member slidable in said sleeve, said valve member having a passage formed therein movable into registry with the idling fuel inlet as the tubular member slides in one direction and so shaped that the flow of fuel through the idling fuel inlet is progressively increased as the tubular member is moved in one direction, a plurality of tapered grooves in the surface of said tubular member which terminate at different positions along the axis of said member so that such grooves are successively brought into registry with the main fuel inlet port and the flow of fuel through each groove is also progressively increased as the tubular member slides within its cooperating sleeve, means for sliding the tubular member within the sleeve to variably control the fuel supply and said grooves being so spaced axially with respect to the idling fuel passage that as the tubular member slides the idling passage is fully open before fuel begins to flow through any of said grooves.

References Cited in the file of this patent

UNITED STATES PATENTS

| | | |
|---|---|---|
| 2,071,876 | Gordon | Feb. 23, 1937 |
| 2,158,737 | Wunsch | May 16, 1939 |
| 2,245,562 | Becker | June 17, 1941 |
| 2,405,888 | Holley | Aug. 13, 1946 |
| 2,411,065 | Silvester | Nov. 12, 1946 |
| 2,412,289 | Pugh et al. | Dec. 10, 1946 |
| 2,414,322 | Mock | Jan. 14, 1947 |
| 2,435,902 | Reggio | Feb. 10, 1948 |
| 2,441,948 | Atkinson | May 25, 1948 |
| 2,457,595 | Orr | Dec. 28, 1948 |
| 2,479,813 | Chamberlin et al. | Aug. 23, 1949 |
| 2,498,939 | Bobier | Feb. 28, 1950 |
| 2,531,780 | Mock | Nov. 28, 1950 |
| 2,616,254 | Mock | Nov. 4, 1952 |

FOREIGN PATENTS

| | | |
|---|---|---|
| 603,884 | Great Britain | June 24, 1948 |

OTHER REFERENCES

SAE Journal, February 1949, pages 26–29.